United States Patent
Tesser et al.

(10) Patent No.: US 11,410,157 B2
(45) Date of Patent: Aug. 9, 2022

(54) PROGRAMMABLE CARD FOR TOKEN PAYMENT AND SYSTEMS AND METHODS FOR USING PROGRAMMABLE CARD

(71) Applicant: Capital One Services, LLC, McLean, VA (US)

(72) Inventors: Daniel Tesser, McLean, VA (US); Luis De La Rosa, Falls Church, VA (US); Jeffrey Wieker, Fairfax, VA (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 70 days.

(21) Appl. No.: 16/693,460

(22) Filed: Nov. 25, 2019

(65) Prior Publication Data
US 2021/0158327 A1    May 27, 2021

(51) Int. Cl.
| | |
|---|---|
| G06Q 20/32 | (2012.01) |
| G06Q 20/40 | (2012.01) |
| G06Q 20/20 | (2012.01) |
| G06Q 20/36 | (2012.01) |
| G06Q 20/38 | (2012.01) |

(52) U.S. Cl.
CPC ....... *G06Q 20/3278* (2013.01); *G06Q 20/204* (2013.01); *G06Q 20/322* (2013.01); *G06Q 20/3674* (2013.01); *G06Q 20/385* (2013.01); *G06Q 20/3825* (2013.01); *G06Q 20/40* (2013.01)

(58) Field of Classification Search
CPC .............. G06Q 20/3278; G06Q 20/20; G06Q 20/3229; G06Q 20/38215; G06Q 20/425; G06Q 20/346; G06Q 20/102; G06Q 20/204; G06Q 20/325; G06Q 20/349; G06Q 20/352; G06Q 20/367; G06Q 20/322; G06Q 20/3226; G06Q 20/353; G06Q 20/354; G06Q 20/3821; G06Q 20/401; G06Q 2220/00; G06Q 20/3674; G06Q 20/3825; G06Q 20/385; G06Q 20/40; G06K 19/06206; G06K 19/07354; G06K 7/084; G06K 19/0726; G06K 19/07762; G06K 7/10297; G06K 19/0727; G07F 7/10
USPC .......................................................... 705/39
See application file for complete search history.

(56) References Cited

U.S. PATENT DOCUMENTS

| | | | |
|---|---|---|---|
| 6,705,520 B1* | 3/2004 | Pitroda | G06K 7/0013 235/380 |
| 8,818,867 B2* | 8/2014 | Baldwin | G06Q 20/353 705/16 |
| 9,218,624 B2 | 12/2015 | Moghadam | |
| 9,275,386 B2 | 3/2016 | Olson et al. | |
| 10,068,217 B1* | 9/2018 | Gopalakrishnan | G06F 11/3058 |
| 10,134,026 B1* | 11/2018 | Koeppel | G06Q 20/204 |

(Continued)

*Primary Examiner* — Slade E Smith
(74) *Attorney, Agent, or Firm* — Bookoff McAndrews, PLLC (57) ABSTRACT

Programmable cards, computer-readable media, and systems are disclosed for token payment. For example, a programmable card for token payment, according to some embodiments, may include an antenna and a contact interface. The card may be configured to store, in the rewritable memory, a token transmitted from a user device via a first near field communication (NFC) signal received by the antenna, and provide the stored token to a point of sales terminal via a second NFC signal transmitted by the antenna or via the contact interface.

20 Claims, 4 Drawing Sheets

(56) References Cited

U.S. PATENT DOCUMENTS

| | | | |
|---|---|---|---|
| 2002/0017568 A1* | 2/2002 | Grant | H01L 43/12 235/491 |
| 2004/0039694 A1* | 2/2004 | Dunn | G06Q 40/02 705/39 |
| 2005/0109841 A1* | 5/2005 | Ryan | G06Q 20/10 235/380 |
| 2006/0208066 A1* | 9/2006 | Finn | H04H 60/63 235/380 |
| 2007/0262138 A1* | 11/2007 | Somers | G06Q 20/40975 235/380 |
| 2007/0282740 A1* | 12/2007 | Wendt | G06Q 40/00 705/39 |
| 2009/0240594 A1* | 9/2009 | Kerner | G06Q 30/0601 705/26.1 |
| 2011/0140841 A1* | 6/2011 | Bona | G07F 7/0846 340/5.83 |
| 2011/0238579 A1* | 9/2011 | Coppinger | G06Q 20/32 705/67 |
| 2011/0246317 A1* | 10/2011 | Coppinger | H04L 63/0853 705/17 |
| 2012/0150669 A1* | 6/2012 | Langley | G06Q 20/102 705/16 |
| 2012/0150687 A1* | 6/2012 | Hart | G06Q 20/3821 705/26.41 |
| 2012/0203700 A1* | 8/2012 | Ornce | G06Q 20/3278 705/67 |
| 2013/0080276 A1* | 3/2013 | Granbery | G06Q 20/3227 705/21 |
| 2013/0146661 A1* | 6/2013 | Melbrod | G06K 19/005 235/435 |
| 2013/0152185 A1* | 6/2013 | Singh | G06Q 20/36 726/9 |
| 2013/0159178 A1* | 6/2013 | Colon | G06Q 20/385 705/41 |
| 2013/0200146 A1* | 8/2013 | Moghadam | G06Q 20/3672 235/379 |
| 2014/0114780 A1* | 4/2014 | Menefee | G06Q 20/327 705/21 |
| 2014/0172700 A1* | 6/2014 | Teuwen | G06Q 20/3226 705/41 |
| 2014/0195425 A1* | 7/2014 | Campos | G06Q 20/3674 705/41 |
| 2014/0291392 A1* | 10/2014 | Teuwen | G06Q 20/341 235/380 |
| 2014/0365374 A1* | 12/2014 | Baldwin | G06Q 20/354 705/65 |
| 2015/0073983 A1* | 3/2015 | Bartenstein | G06Q 20/3572 705/41 |
| 2015/0073999 A1* | 3/2015 | Hosp | G06Q 20/204 705/76 |
| 2015/0134540 A1* | 5/2015 | Law | G06Q 20/02 705/72 |
| 2015/0170014 A1* | 6/2015 | Olson | G06Q 20/354 235/380 |
| 2015/0206136 A1* | 7/2015 | Maddocks | G06Q 20/3672 705/71 |
| 2015/0262164 A1* | 9/2015 | Ranganathan | G06Q 20/322 705/39 |
| 2015/0339663 A1* | 11/2015 | Lopreiato | G06Q 20/40 705/67 |
| 2016/0019449 A1* | 1/2016 | Auten | G06K 19/06206 235/492 |
| 2016/0048833 A1* | 2/2016 | Huxham | G06Q 20/405 705/71 |
| 2016/0098708 A1* | 4/2016 | Loomis | G06Q 20/367 705/39 |
| 2016/0125396 A1* | 5/2016 | Brickell | G06Q 20/401 705/67 |
| 2016/0162883 A1* | 6/2016 | Liscia | G06K 19/06206 705/71 |
| 2016/0203471 A1* | 7/2016 | Zand | G06Q 20/341 705/41 |
| 2016/0253686 A1* | 9/2016 | Roberts | G06Q 30/0201 705/7.32 |
| 2016/0292667 A9* | 10/2016 | Laracey | G06Q 20/327 |
| 2016/0314458 A1* | 10/2016 | Douglas | G06Q 20/363 |
| 2016/0321651 A1* | 11/2016 | Douglas | G06Q 20/227 |
| 2016/0350746 A1* | 12/2016 | Johnson | H04L 9/3239 |
| 2016/0379101 A1* | 12/2016 | Hammad | G07F 7/10 235/380 |
| 2017/0046679 A1* | 2/2017 | Gotlieb | G06K 19/06206 |
| 2017/0061272 A1* | 3/2017 | Deliwala | H04W 12/0431 |
| 2017/0249628 A1* | 8/2017 | Douglas | G06Q 20/3672 |
| 2017/0300904 A1* | 10/2017 | Chung | G06Q 20/12 |
| 2017/0364905 A1* | 12/2017 | Hart | H04B 5/0031 |
| 2018/0068293 A1* | 3/2018 | Dunne | G06Q 20/3223 |
| 2018/0121925 A1* | 5/2018 | Gaikar | G06Q 20/322 |
| 2018/0276935 A1* | 9/2018 | Metral | G07F 7/08 |
| 2018/0278619 A1* | 9/2018 | Jankowfsky | H04L 63/083 |
| 2018/0288166 A1* | 10/2018 | Carlson | H04L 67/28 |
| 2019/0066078 A1* | 2/2019 | Sarin | G07F 19/209 |
| 2019/0073696 A1* | 3/2019 | Ericson | G06Q 30/0239 |
| 2019/0087823 A1* | 3/2019 | Patel | G06Q 20/4093 |
| 2019/0095655 A1* | 3/2019 | Krawczewicz | H04W 12/06 |
| 2019/0139023 A1* | 5/2019 | Vyas | G06Q 20/3821 |
| 2019/0156326 A1* | 5/2019 | Todasco | H04W 4/80 |
| 2019/0190717 A1* | 6/2019 | Beric | H04L 9/3234 |
| 2019/0236585 A1* | 8/2019 | Jeong | G06Q 30/06 |
| 2019/0318345 A1* | 10/2019 | Kallugudde | G06Q 20/40145 |
| 2019/0362334 A1* | 11/2019 | Wang | G06Q 20/40 |
| 2019/0362341 A1* | 11/2019 | Chen | G06Q 20/4018 |
| 2020/0058024 A1* | 2/2020 | Muller | G06Q 10/107 |

* cited by examiner

PROGRAMMABLE CARD FOR TOKEN PAYMENT AND SYSTEMS AND METHODS FOR USING PROGRAMMABLE CARD

TECHNICAL FIELD

Various embodiments of the present disclosure relate generally to payment system technologies and, more particularly, to programmable cards with wireless communication capabilities for token payment and methods and systems for using such programmable cards.

BACKGROUND

A customer may desire the ability to make payments from a credit card account or other financial account in a manner that minimizes the risk of fraudulent usage of the account by unauthorized parties. A token may be used to represent the account of the customer without exposing the account number. Therefore, there is a need for products and techniques that facilitate the usage of tokens, and, more generally, safety in payment making.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, a programmable card and non-transitory computer-readable media are disclosed.

For example, a programmable card for token payment may include: an antenna; a contact interface; and a chip communicatively connected to the antenna and the contact interface, the chip including a processor and a rewritable memory. The processor may be configured to store, in the rewritable memory, a token transmitted from a user device via a first near field communication (NFC) signal received by the antenna, the token representing a primary account number (PAN) of a user of the user device, when the programmable card is connected to a point of sales terminal via NFC and the token is stored in the rewritable memory, provide the stored token to the point of sales terminal via a second NFC signal transmitted by the antenna, and when the programmable card is connected to the point of sales terminal via the contact interface and the token is stored in the rewritable memory, provide the stored token to the point of sales terminal via the contact interface.

Furthermore, a non-transitory computer-readable medium may store instructions that, when executed by one or more processors, cause the one or more processors of a user device to perform operations for configuring a programmable card to perform token payment. The operations may include: connecting to a computer system of a financial services provider; transmitting, to the computer system, a request for a token usable for payment, the token representing a primary account number of a user of the user device; receiving, from the computer system, a response indicative of the token; establishing a near-field communication (NFC) link with the programmable card, the programmable card having an NFC interface and a rewritable memory; and transmitting the token to the programmable card via NFC, so that the token is stored in the rewritable memory of the programmable card and the programmable card is usable for token payment.

Furthermore, a non-transitory computer-readable medium may store instructions that, when executed by one or more processors, cause the one or more processors of a user device to perform operations for configuring a programmable card to perform token payment. The operations may include: connecting to a computer system of a financial services provider so as to access an online banking service, the online banking service providing access to manage a payment card account having a primary account number; receiving a user input indicative of a command to request a token usable for payment, the token representing the primary account number; transmitting, to the computer system, a request for the online banking service to provide the token; receiving, from the computer system, a response indicative of the token; establishing a near-field communication (NFC) link with the programmable card, the programmable card having an NFC interface and a rewritable memory; transmitting the token to the programmable card via NFC, so that the token is stored in the rewritable memory of the programmable card and the programmable card is usable for token payment; and displaying a notification indicating that the token has been written onto the programmable card.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, a mobile device such as a smartphone may receive a token from a remote computer system. The mobile device may then transmit the received token to a programmable card via near-field communication (NFC) so that the token is stored in a memory of the programmable card. To make a payment using the card, the user may bring the card into proximity with a point-of-sales terminal of a merchant, so that the token may be transmitted to the point-of-sales terminal via NFC. The card may have the form of a standard credit card but may have no magnetic stripe.

Figure 1:
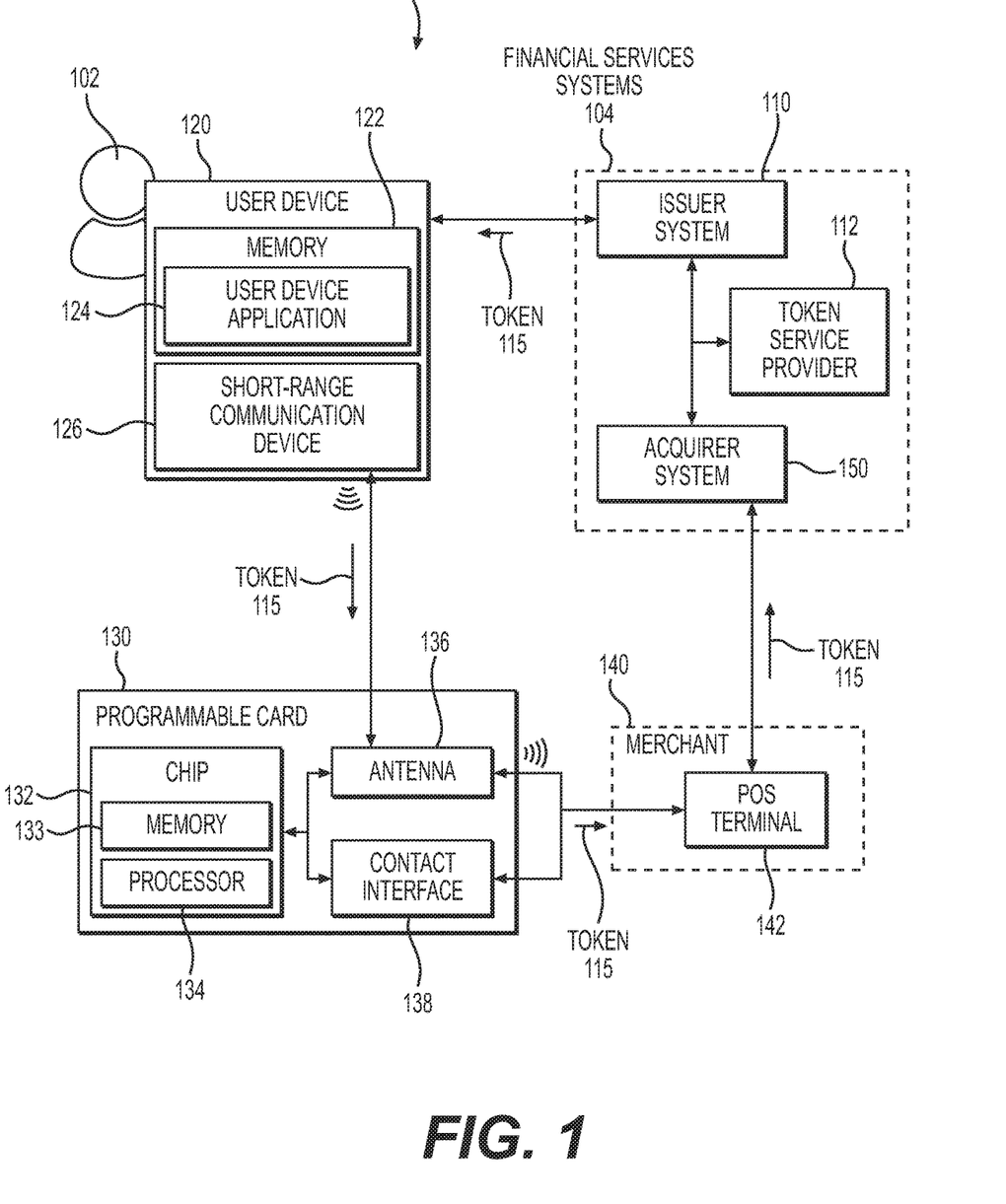
FIG. 1 depicts a system environment for a programmable card, according to one or more embodiments.

FIG. 1 illustrates a system environment 100 for payment transactions, according to one or more embodiments. The system environment 100 may include a user 102, an issuer system 110, a token service provider 112, a user device 120 operated by the user 102, a programmable card 130, a merchant 140, and an acquirer system 150.

Issuer system 110, token service provider 112, and acquirer system 150 may be part of financial services systems 104. It is noted that these elements of financial services systems 104 do not necessarily need to be separate systems. For example, the issuer system 110 and the acquirer system 150 may be the same system operated by the same bank.

Issuer system 110 may be a computer system of an issuer. An issuer may be a financial institution, such as a bank, that maintains a financial account for user 102. Examples of financial accounts include credit card accounts, checking accounts, and other types of payment accounts. As will be described in greater detail below, user 102 may operate user device 120 to request a token 115 from issuer system 110, so that token 115 may be stored on programmable card 130 for purposes of making a payment to merchant 140. The token 115 may represent a primary account number (PAN) of the user 102's financial account. Accordingly, when used at merchant 140, the token 115 may serve as a surrogate for the PAN. Token 115 may be a one-time-use token, and may have use restrictions as described below.

User device 120 may be any suitable computer system operated by user 102 to perform various functionalities described in this disclosure, including the requesting and receiving of token 115. Upon receiving token 115 from the issuer system 110, user device 120 may transmit the token 115 to programmable card 130 for payment use. In some embodiments, user device 120 may be a mobile computing device such as a smartphone, tablet computer, or wearable computing device. However, the present disclosure is not so limited, and it is understood that the user device 120 may be a computing device of any type, including a desktop or laptop computer, that is configured to perform the associated functionalities described in this disclosure.

User device 120 may communicate with issuer system 110 through a communication network, such as the Internet. For example, user device 120 may be a smartphone that is capable of accessing the communication network through Wi-Fi or a cellular network. User device 120 may include a memory 122 storing a user device application 124. User device application 124 may be stored in the form of computer-executable instructions that, when executed by one or more processors of the user device 120, configures the user device 120 to perform various functionalities described in this disclosure. User device application 124 may be, for example, an online banking application, such as a mobile banking app or a browser-executed web application, that is serviced by issuer system 110.

User device application 124 may enable user 102 to access a financial account of the user 102 that is maintained by the issuer. User device application 124 may additionally enable the user 102 to request a token from issuer system 110. For example, the user device application 124 may display a graphical user interface by which the user 102, when logged into the financial account, may specify and submit a token request to the issuer system 110. The token request may be recognized by issuer system 110 as a request to generate or otherwise obtain a token 115 to be transmitted to user device 120.

The token request may specify restrictions on the usage of the token 115 requested by the user 102. Such usage restrictions may be include, for example: an identity of a merchant at which the requested token 115 may be used (specified so that the token 115 is not usable at any other merchant); a time frame during which the token 115 is usable (specified so that the token 115 is not usable outside the timeframe); a geographical area in which the token 115 is usable (defining a restriction that the token 115 is not usable at merchant POS terminals outside of the geographical area); and/or a spending amount limitation specifying a maximum spending limit for the token 115. Such restrictions on the usage of token 115 may be maintained in a database of token service provider 112 or other suitable system. Additionally, as noted above, token 115 may be one-time-use. That is, the token 115 may be deleted from the database of the token service provider 112, or otherwise rendered unusable, once it has been used.

Token 115 may be generated based on the relevant financial account of the user 102, and may be generated by token service provider 112. For example, issuer system 110 may provide token service provider 112 with the primary account number (PAN) of the user 102's financial account. The token service provider 112 may generate the token 115, and store the token 115 in a database such that the token 115 is associated with the PAN. The token service provider 112 may be a computer system operated by a financial services institution that is different from the issuer operating issuer system 110, in which case the token service provider 112 may transmit the token 115 to the issuer system 110 when the token 115 has been generated. However, it is also possible for issuer system 110 and the token service provider 112 to be part of the same computer system operated by the same financial services institution.

User device 120 may include communication device(s) configured to communicate using communication protocol(s), such as Near-Field Communication (NFC), Universal Serial Bus (USB), Bluetooth, and/or WiFi. In various embodiments, the aforementioned communication device(s) may include a short-range communication device 126 configured to communicate wirelessly using a short-range wireless communication protocol. In some embodiments, short-range communication device 126 may be configured to communicate using NFC, in which case user device 120 may be referred to as an NFC-enabled user device. Short-range communication device 126 may be configured to read and write NFC tags via a signal generated by the short-range communication device 126. Therefore, short-range communication device 126 may also be referred to as an NFC tag reader and writer.

After receiving token 115 from issuer system 110, user device 120 may transmit token 115 to programmable card 130 using short-range communication device 126. For example, the user device application 124 may include a functionality enabling the user 102 to input a command indicative of a desire to write token 115 onto the programmable card 130. The user 102 may, for example, activate the functionality and bring the programmable card 130 near an antenna of the short-range communication device 126 (e.g., by tapping the programmable card 130 on the user device 120) to form a communication link between the user device and the programmable card 130. The user device 120 may then write token 115 onto the programmable card 130 via the communication link. Once token 115 has been written onto programmable card 130, the token 115 may then be used to make a payment to merchant 140. To do so, the programmable card 130 may transmit token 115 to a point of sale (POS) device 142 of the merchant 140.

While short-range communication such as NFC is described herein as an example of a method by which user device 120 may communicate with programmable card 130, the present disclosure is not so limited. In general, user device 120 may communicate with programmable card 130 (e.g., to transmit token 115 to programmable card 130, and to transmit and/or receive data to perform any other interactions, such as authentication) using any suitable method. For example, user device 120 may interface with programmable card 130 directly through USB in order to transmit token 115 and/or other data to programmable card 130. In such implementations, programmable card 130 may have a USB port or connector. Additionally or alternatively, user device 120 may communicate with programmable card 130 through a contact interface of the programmable card 130 (e.g., contact interface 138 described below). In such implementations, user device 120 may interface with a card chip reader through a USB port or other interface, wherein the card chip reader may serve as an intermediary between user device 120 and the programmable card 130.

It is noted that the different methods of communication between user device 120 and programmable card 130 described in this disclosure are not intended to be mutually exclusive. That is, user device 120 may be capable of communicating with programmable card 130 through multiple forms of communication. Additionally, the user device 120 and/or programmable card 130 may have any necessary hardware components to implement the communication method(s). For example, the programmable card 130 may have a power source (e.g., a battery), if needed to implement a communication method, and user device 120 may have a USB port or connector, if needed.

As shown in FIG. 1, programmable card 130 may include a memory 133, a processor 134, an antenna 136, and a contact interface 138. Memory 133 may be a rewritable memory used to store token 115 received from user device 120. Memory 133 and processor 134 may be part of a chip 132. Processor 134 may be, for example, a microcontroller, and may be configured to perform payment operations in compliance with a suitable payment standard, such as Eurocard, MasterCard, Visa (EMV).

Antenna 136 may be part of a short-range wireless communication interface used for communication (e.g., NFC) between the programmable card 130 and external devices such as the short-range communication device 126 of user device 120 and a contactless smart card reader of POS terminal 142. In addition to antenna 136, the short-range wireless communication interface of the programmable card 130 may include any circuitry coupling the antenna 136 and the chip 132 to one another. Antenna 136 may be coupled to a controller (e.g., an NFC controller), which may be processor 134 or be included in processor 134. The combination of antenna 136 and the controller may be collectively referred to as a tag, such as an NFC tag.

Using antenna 136, programmable card 130 may receive token 115 from user device 120. In some embodiments, encryption may be performed on the token 115 by the user device 120 and/or processor 134, so that the token 115 may be stored in memory 133 in an encrypted form.

Memory 133 may be rewritable, such that short-range communication device 126 may delete token 115 and/or replace with a different token. For example, the processor 134 may be configured to overwrite the stored token 115 with a second token received from the user device. Since memory 113 may be reprogrammed to carry different information (e.g., different tokens) at different times, programmable card 130 may also be referred to as a reprogrammable card.

Contact interface 138 may include a plurality of electrically conductive contact pads that are configured to couple to a card reader of POS terminal 142 when the programmable card 130 is inserted into the card reader. Contact interface 138 and antenna 136 may serve as alternative interfaces of one another for communication with external devices. That is, the programmable card 130 may be capable of receiving data (e.g., token 115) through both contact interface 138 and antenna 136, and may be capable of transmitting data through both contact interface 138 and antenna 136. It is noted that in various embodiments discussed herein, token 115 is received from user device 120 through antenna 136. However, it is also possible for the token 115 to be received from contact interface 138, from a device capable of transmitting token 115 to programmable card 130 in such a manner.

Chip 132 may be communicatively connected to both antenna 136 and contact interface 138. Processor 134 may be configured to operate both antenna 136 and contact interface 138 to receive and/or transmit information. Accordingly, chip 132 may be a dual-interface chip having both contact and contactless interfaces for communication with external devices.

Figure 2A:
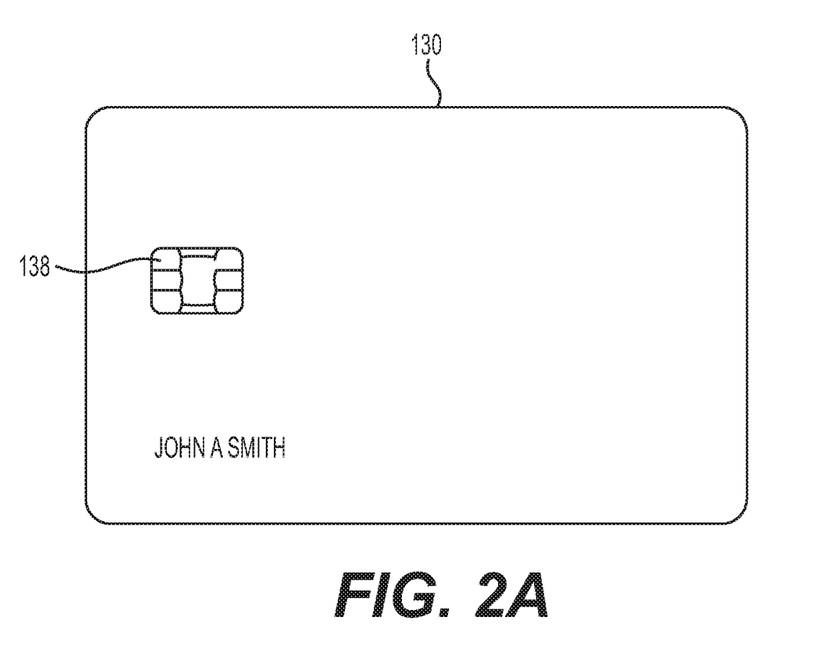
FIGS. 2A-2B respectively depict the front and back of a programmable card, according to one or more embodiments.
Figure 2B:
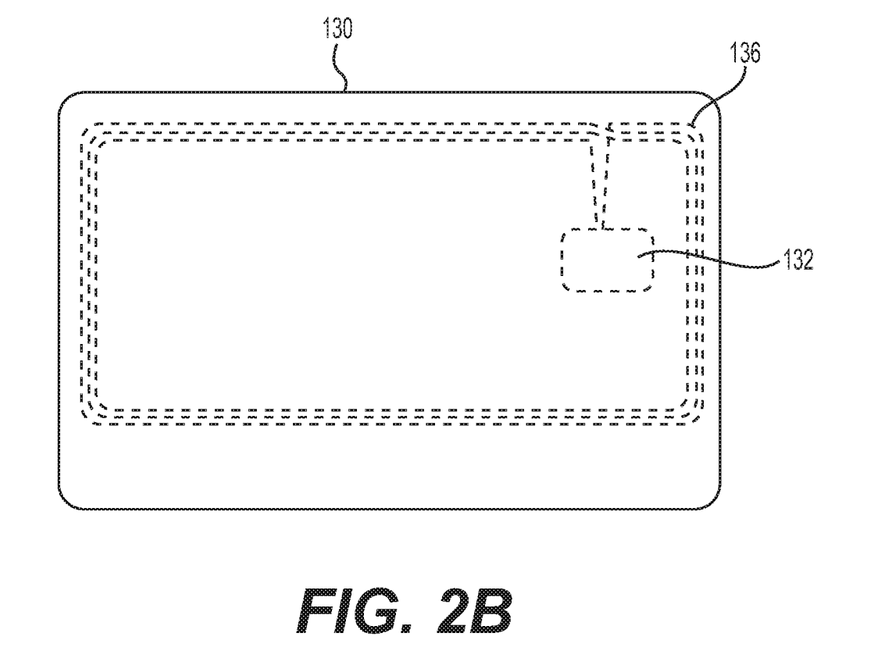

FIGS. 2A and 2B illustrate an example of programmable card 130. FIG. 2A illustrates an example of the front side of the programmable card 130. FIG. 2B illustrates an example of the back side of the programmable card 130. Programmable card 130 may have the shape and/or size of a standard credit card. Therefore, programmable card 130 may have dimensions of 85.60×53.98 mm, as specified by the ISO/IEC 7810 ID-1 standard, or substantially such dimensions. Programmable card 130 may have rounded corners. Additionally, the contact pads of the contact interface 138 may be located at a standard position used in chip cards (e.g., a centralized area on a left-hand side as viewed from the front side of the programmable card 130).

Antenna 136 may be embedded inside programmable card 130, as shown in FIG. 2B. Antenna 136 may be a conductive coil having any suitable physical form (e.g., a rectangular or circular form), and may have any suitable size and number of turns. Chip 132 may be positioned at any suitable location. In some embodiments, chip 132 may directly underlay contact interface 138, for purposes of ease of connection with contact interface 138.

Antenna 136 and contact interface 138 may be the only functional payment mechanisms of programmable card 130 for purposes of electronically interfacing with POS terminal 142. For example, while credits cards in general may include a magnetic stripe used to store data, programmable card 130 according to the present disclosure may include no magnetic stripe. As shown in FIG. 2B, the back side of programmable card 130 does not have a magnetic stripe.

While programmable card 130 may display a name and corporate logos, programmable card 130 may have no financial account numbers (e.g., PAN) printed or otherwise visible on any surface of programmable card 130. In some embodiments, token 115, stored in memory 133, may be the only information that is used to conduct payment using programmable card 130. In such embodiments, no credit card number may be stored in memory 133.

By storing token 115 for payment and omitting a magnetic stripe, programmable card 130 may provide the benefits of safety and security. For example, by substituting for an actual credit card, use of programmable card 130 may avoid loss of the actual credit card. Additionally, due to the token payment system as described above, the effects of a data breach at merchant 140 may be minimized, and unintentional over-spending may be eliminated.

User 102 may have the option of using either antenna 136 or contact interface 138 to communicatively couple to POS terminal 142. For example, the processor 134 may be configured to provide token 115 to POS terminal 142 via an NFC signal transmitted by antenna 136 if the programmable card 130 is connected to POS terminal 142 via NFC, and provide the token 115 to the POS terminal 142 via the contact interface 138 if the programmable card 130 is connected to POS terminal 142 via the contact interface 138. That is, the processor 134 may transmit the token 115 through the appropriate interface, depending on how the user 102 interfaces the programmable card 130 with the POS terminal 142.

During communication between the programmable card 130 and the POS terminal 142 via antenna 136 or contact interface 138, the POS terminal 142 may read the token 115 stored in memory 133. Financial services systems 104 may then process the payment transaction using the token 115 read from programmable card 133.

Programmable card 130 may be configured to perform all processes necessary to comply with transaction processes of a payment standard, such as standards used for EMV payment. For example, the EMV transaction flow may include a "read application data" step in which the chip 132 of the programmable card 130 supplies the POS terminal 142 with an Application File Locator (AFL) indicative of records that the POS terminal 142 is to read from the memory 133 of the programmable card 130. Such records may include the token 115. Based on the AFL, the POS terminal 142 may read the token 115 stored in the memory 133.

POS terminal 142 may be any device that receives payment instructions from programmable card 130. POS terminal 142 may have any suitable structure and configuration for interfacing with programmable card 130. For example, POS terminal may include hardware configured to receive data through short-range wireless communication (e.g., NFC) and direct contact with a contact interface such as contact interface 138. POS terminal 142 may communicate with Financial services systems 104 to process the payment. For example, POS terminal 142 may transmit the token 115 to acquirer system 150, which may communicate with issuer system 110 and/or token service provider 112 to receive authorization to complete the payment.

In some embodiments, the processor 134 of programmable card 130 may be configured to delete the token 115 upon providing the stored token 115 to the point of sales terminal 142. This deletion may be automatically performed by the programmable card 130, or performed in response to a command from the POS terminal 142 to delete the token 115.

In some embodiments, the programmable card 130 may be configured perform authentication of an external component. For example, the processor 134 of the programmable card 130 may be configured to authenticate the user device 120 prior to storing the token 115 in the memory 133. The processor 134 may also be further configured to authenticate the POS terminal 142 prior to providing the token 115 to the POS terminal 142. Authentication may be performed using any suitable method.

Figure 3:
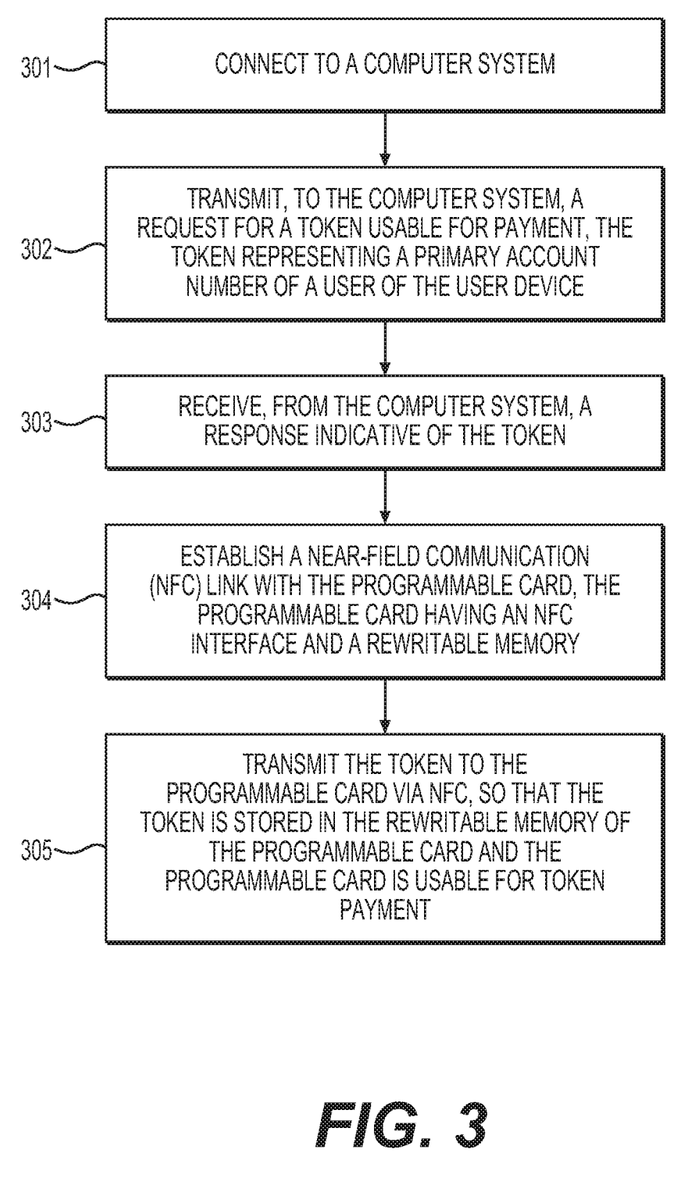
FIG. 3 depicts a method for using a programmable card, according to one or more embodiments.

FIG. 3 is a flowchart illustrating a method for token payment. The method may be performed by a computer system such as user device 120. In some embodiments, the user device application 124 may provide the user device 120 with the functionality of performing the method of FIG. 3. For example, the memory 122 of the user device 120 may store user device application 124 in the form of instructions that, when executed by one or more processors of the user device 120, cause the one or more processors of a user device to perform the method of FIG. 3.

Step 301 may include connecting to a computer system. Such a computer system may be issuer system 110, or other computer system of a financial services provider, and may provide an online banking service accessible via the user device 120 once the user device 120 is connected to the computer system. The user device 120 may transmit credentials to the issuer system 110 in order to log into the online banking service.

Step 302 may include transmitting, to the computer system, a request for a token (e.g., token 115) usable for payment. The token 115 may represent a primary account number of a user 102 of the user device 120.

For example, user device 120 may receive a user input, generated as a result of an action performed by user 102 on the user device application, that is indicative of a command to request a token (e.g., token 115) usable for payment. The online banking service may provide a service of managing or accessing features of a payment card account with which the aforementioned primary account number is associated. The user 102, upon having logged into the online banking service, may request the token 115 such that the token 115 represents the primary account number. Step 302 may be performed in response to receiving such a user input.

User device 120 may additionally receive a user input indicative of one or more use limitations of the token 115, such as a spending amount limitation of the token 115, a merchant to which use of the token 115 is to be to be limited, and/or a time frame during which the token 115 is usable. The request transmitted in step 302 may be indicative of such spending amount limitation.

For example, the user device 120 may display a graphical user interface enabling the user 102 to specify one or more use limitations of the token. Once the use limitations have been specified, the user interface may also enable the user 102 to input the aforementioned command to request the token 115 from the issuer system (e.g., issuer system 110).

Step 303 may include receiving, from the computer system, a response indicative of the token. The response may include the token in any suitable form or format, including encrypted formats, that permits the token to be used for storage on programmable 130 or for payment at POS terminal 142.

Step 304 may include establishing a near-field communication (NFC) link with the programmable card 130, which may have an NFC interface and a rewritable memory (e.g., memory 133). For example, user device 120 may establish an NFC link using short-range communication device 126. Once the NFC link has been established, user device 120 may receive a user input indicative of a command to transfer the token 115 to programmable card 130. Prior to the transmitting the token 115 to the programmable card 130, the user device 120 may authenticate the programmable card 130 through the NFC link. Successful authentication may be, for example, a determination that the programmable card 130 is a suitable article on which the token 115 is to be stored. This determination may be, for example, based on information stored on the programmable card 130.

Step 305 may include transmitting the token 115 to the programmable card 130 via NFC. Accordingly, the token 115 may store in the rewritable memory of the programmable card 130 and the programmable card 130 may be usable for token payment, as described above in connection with the usage of token 115 for payment at POS terminal 142.

The method of FIG. 3 may include additional steps. For example, a further step may include displaying a notification indicating that the token 115 has been written onto the programmable card 130.

The programmable cards, methods and systems described in this disclosure may realize benefits such as safety of not having a credit card number or other financial account number stolen. Even if there is a breach at a merchant, the risk of loss may be minimized by the use of tokens. Additionally, the spending limitations for the tokens stored on the programmable cards, for example, may prevent unintentional over-spending.

In general, any method discussed in this disclosure that is understood to be computer-implementable, such as the method described in connection with FIG. 3, may be performed by one or more processors of a computer system, such as issuer system 110 and user device 120, as described above. A method or method step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as user device 120, issuer system 110, token service provider 112, acquirer system 150, and POS terminal 142, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 4:
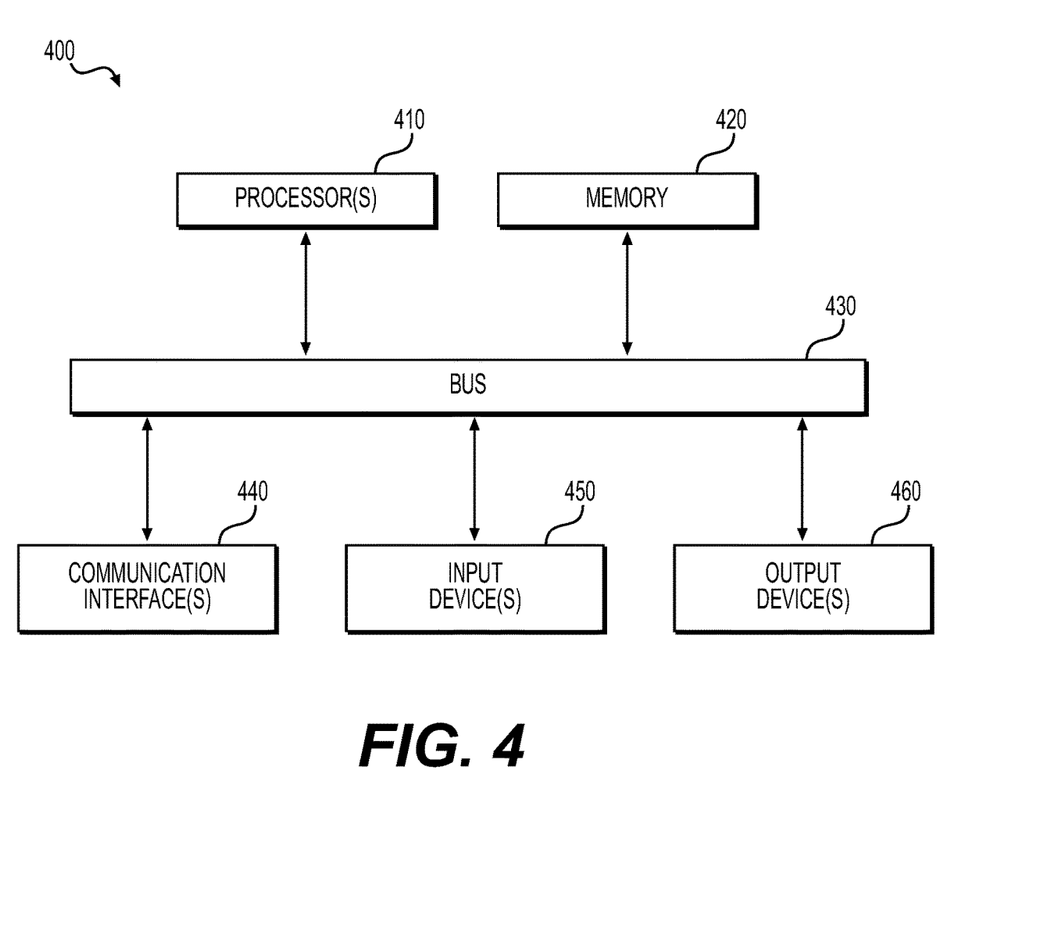
FIG. 4 depicts a computer system, according to one or more embodiments.

FIG. 4 illustrates an example of a computing device 400 of a computer system. The computing device 400 may include processor(s) 410 (e.g., CPU, GPU, or other processing unit), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A programmable card for token payment, comprising:
an antenna;
a contact interface; and
a chip communicatively connected to the antenna and the contact interface, the chip including a processor and a rewritable memory, the processor configured to:
  store, in the rewritable memory, a first token transmitted from a user device via a first near field communication (NFC) signal received by the antenna, the first token representing a primary account number of a user of the user device and defining at least one of a time frame during which the first token is usable or a geographical area in which the first token is usable,
  when the programmable card is connected to a point of sales terminal via NFC and the first token is stored in the rewritable memory, provide the stored first token to the point of sales terminal via a second NFC signal transmitted by the antenna,
  when the programmable card is connected to the point of sales terminal via the contact interface and the first token is stored in the rewritable memory, provide the stored first token to the point of sales terminal via the contact interface, and
  overwrite the stored first token in the rewriteable memory with a second token transmitted from the user device via a third NFC signal received by the antenna, the second token representing the primary account number of the user of the user device and defining the time frame during which the second token is usable or the geographical area in which the second token is usable such that the second token is different than the first token.

2. The programmable card according to claim 1, wherein the programmable card does not have a magnetic stripe.

3. The programmable card according to claim 1, wherein the processor is further configured to authenticate the user device prior to storing the first token in the rewritable memory.

4. The programmable card according to claim 1, wherein the processor is further configured to authenticate the point of sales terminal prior to providing the stored first token to the point of sales terminal.

5. The programmable card according to claim 1, wherein the stored first token is encrypted.

6. The programmable card according to claim 1, wherein the stored first token has a spending amount limitation.

7. The programmable card according to claim 1, wherein the stored first token is limited to a specified merchant.

8. The programmable card according to claim 1, wherein the stored first token is a one-time-use token.

9. The programmable card according to claim 1, wherein the processor is further configured to reprogram the rewriteable memory with the second token such that the rewriteable memory stores one token at a time.

10. A method for token payment, the method comprising:
storing, by at least one processor, in a rewritable memory of a programmable card, a first token transmitted from a user device via a first near field communication (NFC) signal received by an antenna of the programmable card, the first token representing a primary account number of a user of the user device and defining at least one of a time frame during which the first token is usable or a geographical area in which the first token is usable,
when the programmable card is connected to a point of sales terminal via NFC and the first token is stored in the rewritable memory, providing, by the at least one processor, the stored first token to the point of sales terminal via a second NFC signal transmitted by the antenna,
when the programmable card is connected to the point of sales terminal via a contact interface of the programmable card and the first token is stored in the rewritable memory, providing, by the at least one processor, the stored first token to the point of sales terminal via the contact interface, and
overwriting, by the at least one processor, the stored first token in the rewriteable memory with a second token transmitted from the user device via a third NFC signal received by the antenna, the second token representing the primary account number of the user of the user device and defining at least one of the time frame during which the second token is usable or the geographical area in which the second token is usable such that the second token is different than the first token.

11. The method of claim 10, wherein the programmable card does not have a magnetic stripe.

12. The method of claim 10, further comprising authenticating, by the at least one processor, the user device prior to storing the first token in the rewritable memory.

13. The method of claim 10, further comprising authenticating, by the at least one processor, the point of sales terminal prior to providing the stored first token to the point of sales terminal.

14. The method of claim 10, wherein the stored first token is encrypted.

15. The method of claim 10, wherein the stored first token includes a spending amount limitation.

16. The method of claim 10, wherein the stored first token includes a specified merchant.

17. The method of claim 10, wherein the stored first token includes a one-time-use token.

18. The method of claim 10, wherein the programmable card includes a chip communicatively connected to the antenna and the contact interface, wherein the chip includes the at least one processor and the rewritable memory.

19. The method of claim 10, further including reprogramming the rewriteable memory with the second token such that the rewriteable memory stores one token at a time.

20. A method for token payment, the method comprising:
storing, by at least one processor, in a rewritable memory of a programmable card not having a magnetic stripe, a first token transmitted from a user device via a first near field communication (NFC) signal received by an antenna of the programmable card, the first token representing a primary account number of a user of the user device and defining at least one of a time frame during which the first token is usable or a geographical area in which the first token is usable;
establishing, by the at least one processor, a connection to a point of sales terminal via at least one of a second NFC signal or a contact interface;
authenticating, by the at least one processor, the point of sales terminal;
when the programmable card is connected to the point of sales terminal via the second NFC signal and the first token is stored in the rewritable memory, providing, by the at least one processor, the stored first token to the point of sales terminal via the second NFC signal transmitted by the antenna, when the programmable card is connected to the point of sales terminal via the contact interface and the first token is stored in the rewritable memory, providing, by the at least one processor, the stored first token to the point of sales terminal via the contact interface; and overwriting, by the at least one processor, the stored first token in the rewriteable memory with a second token transmitted from the user device via a third NFC signal received by the antenna, the second token representing the primary account number of the user of the user device and defining at least one of the time frame during which the second token is usable or the geographical area in which the second token is usable such that the second token is different than the first token.

\* \* \* \* \*